(12) United States Patent
Eriksson et al.

(10) Patent No.: US 7,068,631 B2
(45) Date of Patent: Jun. 27, 2006

(54) TRAINING SEQUENCE HOPPING IN A RADIO COMMUNICATION SYSTEM

(75) Inventors: Mathias Eriksson, Uppsala (SE); Christofer Lindheimer, Kista (SE); Johan Molnö, Bromma (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 822 days.

(21) Appl. No.: 09/921,999

(22) Filed: Aug. 6, 2001

(65) Prior Publication Data

US 2003/0026223 A1 Feb. 6, 2003

(51) Int. Cl.
*H04B 7/212* (2006.01)
*H04J 3/00* (2006.01)

(52) U.S. Cl. ............... 370/337; 370/347; 370/503; 375/231; 375/347; 455/303; 455/450

(58) Field of Classification Search ............... 370/337, 370/347, 503, 350; 375/299, 347, 267, 231, 375/132; 455/65, 303, 403, 450
See application file for complete search history.

(56) References Cited

U.S. PATENT DOCUMENTS

| | | | |
|---|---|---|---|
| 5,717,761 A | | 2/1998 | Yatagai |
| 5,930,248 A * | | 7/1999 | Langlet et al. ............... 370/347 |
| 6,256,486 B1 * | | 7/2001 | Barany et al. ............... 455/296 |
| 6,347,223 B1 * | | 2/2002 | Schreib ...................... 455/403 |
| 6,377,636 B1 * | | 4/2002 | Paulraj et al. ............... 375/346 |
| 6,407,993 B1 * | | 6/2002 | Moulsley ..................... 370/347 |
| 6,674,817 B1 * | | 1/2004 | Dolle et al. .................. 375/342 |
| 6,700,882 B1 * | | 3/2004 | Lindoff et al. ............... 370/337 |
| 6,707,807 B1 * | | 3/2004 | Menzel ........................ 370/337 |
| 6,721,292 B1 * | | 4/2004 | Ritter et al. ................. 370/335 |
| 6,795,427 B1 * | | 9/2004 | Klein et al. .................. 370/347 |
| 6,801,589 B1 * | | 10/2004 | Dogan ......................... 375/343 |
| 2002/0009065 A1 * | | 1/2002 | Molko ......................... 370/337 |
| 2002/0067712 A1 * | | 6/2002 | Bergkvist .................... 370/347 |

(Continued)

FOREIGN PATENT DOCUMENTS

DE   199 17 334 A   10/2000

(Continued)

OTHER PUBLICATIONS

Matti Salmenkaita et al., "A Practical DCA Implementation for GSM Networks: Dynamic Frequency and Channel Assignment," Nokia Networks, Malaga, Spain.
3GPP TS 45.002 V4.3.0 (Apr. 2001), 3rd Generation Partnership Project; Technical Specification Group GSM/EDGE, Radio Access Network; Digital cellular telecommunications system (Phase 2+), Multiplexing and multiple access on the radio path (Release 4).

*Primary Examiner*—Ajit Patel
*Assistant Examiner*—Chirag Shah
(74) *Attorney, Agent, or Firm*—Nixon & Vanderhye P.C.

(57) ABSTRACT

The present invention employs training sequence hopping in a cellular communications system to permit tight frequency reuse by minimizing or avoiding co-channel interference and/or other signal degrading phenomena. During a first portion of a transmission, e.g., a first burst, a first training sequence is used. During a second portion of that transmission, e.g., a second burst, a second different training sequence is used. Different training sequences are used for different portions of the transmission according to a predetermined training sequence hopping pattern and with a predetermined number of training sequences. The portion duration can extend for the length of a burst, for more than one burst, for a speech frame, or for some other time period.

57 Claims, 7 Drawing Sheets

U.S. PATENT DOCUMENTS

| | | | |
|---|---|---|---|
| 2002/0122406 A1* | 9/2002 | Chillariga et al. | 370/347 |
| 2002/0150182 A1* | 10/2002 | Dogan et al. | 375/343 |
| 2003/0058926 A1* | 3/2003 | Balakrishnan et al. | 375/146 |
| 2004/0203806 A1* | 10/2004 | Craig et al. | 455/450 |

FOREIGN PATENT DOCUMENTS

| | | |
|---|---|---|
| EP | 0 649 257 A | 4/1995 |
| WO | 99.67916 A | 12/1999 |

* cited by examiner

TRAINING SEQUENCE HOPPING IN A RADIO COMMUNICATION SYSTEM

FIELD OF THE INVENTION

The present invention relates to communications, and more particularly, to training sequences used to estimate the parameters for a radio channel model in a mobile radio communications system.

BACKGROUND AND SUMMARY OF THE INVENTION

In radio communications, there are different ways to divide and access radio resources to effect a communication. In frequency division multiple access (FDMA), a radio channel is typically assigned to a narrow frequency bandwidth for the duration of a call. In time division multiple access (TDMA), radio resources are divided and accessed using a narrow frequency bandwidth and a time period or time slot. In Code Division Multiple Access (CDMA), all users may transmit over the same relatively wide bandwidth. The wide bandwidth allows for a high degree of channel coding. Users can therefore be distinguished at a receiver by an assigned pseudo-noise code sequence.

The capacity of a radio communications system may be increased by dividing the system's geographical coverage area into cells. Radio channel resources, e.g., radio frequencies, time slots, code sequences, etc., used in a first cell may be re-used in a second cell located a sufficient distance from the first cell. That distance should be sufficient so that interference between the areas does not substantially degrade quality and performance in either cell.

Thus, a limiting factor for channel re-use is interference, and in particular, co-channel interference caused by nearby radios using the same radio channel. However, increasing amounts of co-channel interference may be tolerated depending on the amount and sophistication of signal processing at the receiver, e.g., coding, diversity, interleaving, etc. The more co-channel interference receivers can tolerate, the more system operators can decrease the re-use distance, plan a "tighter" network, and thereby increase capacity. Network planning distributes the limited radio resources in a certain reuse pattern over the coverage area so that the quality throughout the area is adequate given the number of subscribers and types of services to be supported.

FIG. 1 illustrates, for an cellular system, an example cellular pattern with a 1-to-3 re-use factor where the available spectrum is divided into 3 separate frequency groups all of which are used within one base station site. A mobile station 10 communicates on frequency F2 with base station 12. As the mobile station 10 moves to another location in the network, a handover may be performed to another frequency in another sector, e.g., it may move to be served by base station 14 on frequency F1.

Re-use in TDMA systems involves time slots as well as frequencies. FIG. 2 illustrates a timeslot pattern on one frequency as specified for a GSM type of mobile radio communication system. A GSM cellular radio system is described here and below as an example of a cellular radio system. However, it is understood that the following description and the invention are not limited to GSM. In GSM, there are 8 timeslots (TN0–TN7) distributed on each carrier frequency. A user is allocated one (or more) of these timeslots for a communication. Each repeated cycle of all timeslots is a frame. The GSM cellular standard specifies a set of repetition patterns for frames related to frame numbering and repetition of certain control channel information. The GSM frame structure is described in the 3GPP TS 45.002, ver. 4.3.0 specification, the disclosure of which is incorporated here by reference.

A modulated signal transmitted during a timeslot on one frame is commonly referred to as a burst. A GSM burst structure specifies different parts of the burst to carry different types of information. With Gaussian Minimum Shift Keying (GMSK) modulation specified for GSM, each burst contains 114 coded data bits. The GSM burst structure is illustrated in FIG. 3 and is essentially symmetrical around a symbol field called a training sequence (TS) 38. This training sequence is a known symbol sequence used by the radio receiver to estimate the parameters for a model of the current radio channel. That model estimates how the current radio channel has distorted the burst as a result of transmission over the air. Two flag bits 36 surrounding the training sequence indicate the type of information included in the data fields, i.e., user data or system signaling information. The user data bits are separated into two different fields 34, and the burst begins and ends with a tail bit field 32 extending over 3 modulation symbols.

The training sequence 38 contains 26 modulation symbols corresponding to 26 bits, since GMSK is a binary modulation, and there are 8 different training sequences defined for GSM. The training sequences have very good autocorrelation properties meaning that a convolution of a training sequence X(n) with itself generates a high correlation result. However, convolving training sequence X(n) with a shifted version of that same sequence, X(n+d), d≠0, generates a zero correlation result, or close thereto. The good autocorrelation properties of the training sequences make for easy and accurate synchronization and radio channel estimations.

The burst structure illustrated in FIG. 3 is normally used for both uplink and downlink user communications in GSM. For example, full rate speech CODECs in GSM interleave 20 ms of coded speech, (i.e., a speech frame), on 8 consecutive bursts, each burst having eight time slots. Bit interleaving distributes consecutive speech codec output information, i.e., bits from the same frame, in an intelligent way on several bursts so that if one burst is lost in the transmission over the radio channel, it may still be possible to accurately decode the 20 ms speech with the help of the channel coding. Indeed, coding redundancy together with interleaving could permit proper detection of transmitted user information even over poor radio channel connections.

Enhanced radio transmission performance, whether by improved coding, improved transmission techniques, improved receiver techniques, etc., may permit a decrease in re-use distance in the cellular network. Decreased re-use distance, (sometimes referred to as "tight reuse"), permits increased network capacity. In tight re-use networks, occasional interference which only corrupts one or a few bursts is usually not a significant problem because of channel coding and interleaving. However, if there are significant and fairly consistent amounts of interference, especially co-channel interference from a close-by interferer operating on the same frequency, a larger number of bursts may be adversely effected to the point where they can not be satisfactorily compensated for using interleaving and channel coding. In this regard, co-channel interference is just one of a myriad of signal degrading phenomena that adversely affect mobile connections including small-scale fading (also called multipath, fast, or Rayleigh fading), large scale fading (also called log-normal fading or shadowing), path loss, and time dispersion. It is thus desirable to spread the effects of signal degradation in the system so that an individual connection experiences a varying signal degradation.

To spread interference or other factors that degrade the quality of the signal, frequency hopping may be used. FIG. 4 illustrates the frequency hopping concept in GSM using the GSM frame structure. Each GSM frame is transmitted on a different frequency. Bursts belonging to one connection "frequency hop" between each frame, i.e., consecutive bursts are transmitted on different frequencies. The frequency hopping algorithm in GSM allows for different types of hopping patterns including pseudo-random and cyclic. Users are separated both by different frequency hopping patterns and different offsets in the frequency hopping pattern. The GSM frequency hopping is more thoroughly described in the 3GPP TS 45.002 specification referred to above.

With frequency hopping, each burst in a connection experiences different interference levels from different channels and different cells. As a result, the likelihood that there will be a single strong interference source throughout a consecutive number of bursts is significantly decreased. Because a connection encounters different interfering sources, frequency hopping, especially pseudo-random frequency hopping, provides a kind of interference diversity. In this way, random or pseudo-random frequency hopping is particularly useful to average co-channel interference and spread interference over all users in the system. Frequency hopping, (especially cyclic frequency hopping), is also useful at providing frequency diversity to compensate for different types of fading of the radio signal including multipath fading. For a particular frequency, if there is a fading dip in the exact position of the receiver, changing the frequency moves the fading dip, and the probability that a new fading dip will be located at the exact same position is low.

These interference averaging benefits associated with frequency hopping are particularly advantageous in a time-synchronized system. In a time-synchronized system, different base station sectors or cells at a single base station site transmit a burst at the same instant, i.e., a start of a burst occurs at the same time. If the system is time-synchronized, a user will be interfered by the same source throughout the whole burst. This makes it possible to avoid interference from close-by neighbor cells by allocating frequency hopping sequences in an intelligent way, usually referred to as mobile allocation index offset (MAIO) management.

In any cellular network trying to deal with co-channel interference and other signal degrading phenomena, even in a tight-reuse, frequency hopping network, it is useful to explore other ways to differentiate between user or other different transmissions. To this end, the present invention employs training sequences. Training sequences include a sequence of symbols known by both a transmitter and a receiver and are used by the receiver to determine how the current radio channel and interference is affecting transmitted symbols. By determining the difference between what symbols were transmitted and what were received, a channel model can be estimated and updated. That channel model can then be used to determine the values of transmitted symbols whose values are unknown to the receiver. Accordingly, transmission from a serving base station may be identified by correlating it to a certain training sequence during the training sequence period. Different training sequences may be purposefully selected for close-by cells using the same radio channels for communication. This purposeful training sequence selection/assignment to differentiate between cells using the same frequency requires a new dimension in the planning of a network; it requires training sequence planning.

Moreover, in a time-synchronised system with a tight frequency reuse, as described above, the training sequence planning will be complicated because the training sequence transmissions from different base stations will coincide/collide in some mobile stations. This is illustrated in FIG. 5. Serving base station 52 transmits a burst 58 from using the frequency F1 during the timeslot TN1. Neighboring base station 54 transmits a burst 59 from using the same frequency F1 during the same timeslot TN1. Mobile station 56 receives the two bursts 58 and 59 simultaneously. Despite this "collision," if bursts 58 and 59 are transmitted using different training sequences, the mobile station can separate the two bursts.

In order to use training sequences to distinguish between bursts, it is important for those sequences to have good cross-correlation properties in addition to good auto-correlation properties. Good cross-correlation means that the convolution of two different training sequences, e.g., X(n) and Y(n), results in a small or zero value. Without good cross-correlation properties, it is difficult to separate two transmissions, e.g., two bursts received at the same time from base stations 52 and 54. Unfortunately, training sequences typically used in current cellular radio communications systems, e.g., training sequences defined for GSM, do not necessarily have consistent, good cross-correlation properties. Hence, correlation performance depends on the two specific training sequences being correlated. Although some training sequence pairs may have good cross-correlation properties, other pairs will have poor cross-correlation properties. The latter is a problem if such a pair is used in close-by cells to distinguish between user bursts. This means that training sequence planning becomes more complicated since close-by neighbor cells should use not only different training sequences, but also different training sequences with good cross-correlation properties.

It is an object of the invention to permit tight frequency-reuse while distributing co-channel interference and/or other signal degrading phenomena.

It is an object of the present invention to employ training sequences to distinguish between different user bursts without having to perform significant associated network planning.

It is an object of the invention to employ training sequences to distinguish between different user bursts without requiring all training sequences to have good cross-correlation properties.

The present invention overcomes the problems described above and meets these and other objects using training sequence hopping. During a first portion of a transmission, e.g., a first burst, a first training sequence is used. During a second portion of that transmission, e.g., a second burst, a second different training sequence is used. Different training sequences are used for different portions of the transmission according to a predetermined pattern and with a predetermined number of training sequences. The portion duration can extend for the length of a burst, for more than one burst, for a speech frame, or for some other time period.

For transmissions in either or both the uplink and downlink directions, different training sequences are used in a pseudo-random, cyclic, or other manner for different portions of a transmission. Information regarding a training sequence hopping pattern to be used for a certain transmission burst or other portion is communicated between appropriate base and mobile stations. For example, a training sequence hopping pattern may be parameterized and sent as a part of control signaling for a call setup procedure, or after a new channel allocation has taken place. In a receiving station, the signaled training sequence hopping pattern is used to select the appropriate training sequence to correlate with a received transmission portion.

A training sequence hopping pattern generator generates a training sequence hopping pattern for a certain transmission. The hopping pattern generated may be pseudo-random, cyclic, or some other pattern. In one example embodiment, a training sequence hopping pattern is determined using a parameter set including one or both of a number of training sequences in the hopping pattern and a current frame number. A hopping offset may also be employed.

BRIEF DESCRIPTION OF THE DRAWINGS

Features, objects and advantages of the present invention will become apparent to those skilled in the art by reading the following detailed description where references will be made to the appended figures.

DETAILED DESCRIPTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention is described making references to a GSM cellular communication system and extensions thereof as described and illustrated above. However, the invention is equally applicable to other types of cellular radio systems, and indeed, to any communication system employing training sequences. In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuitry, using software functioning in conjunction with a suitably programmed digital microprocessor or general purpose computer, using an Application Specific Integrated Circuit (ASIC), and/or using one or more Digital Signal Processors (DSPs).

Figure 6:
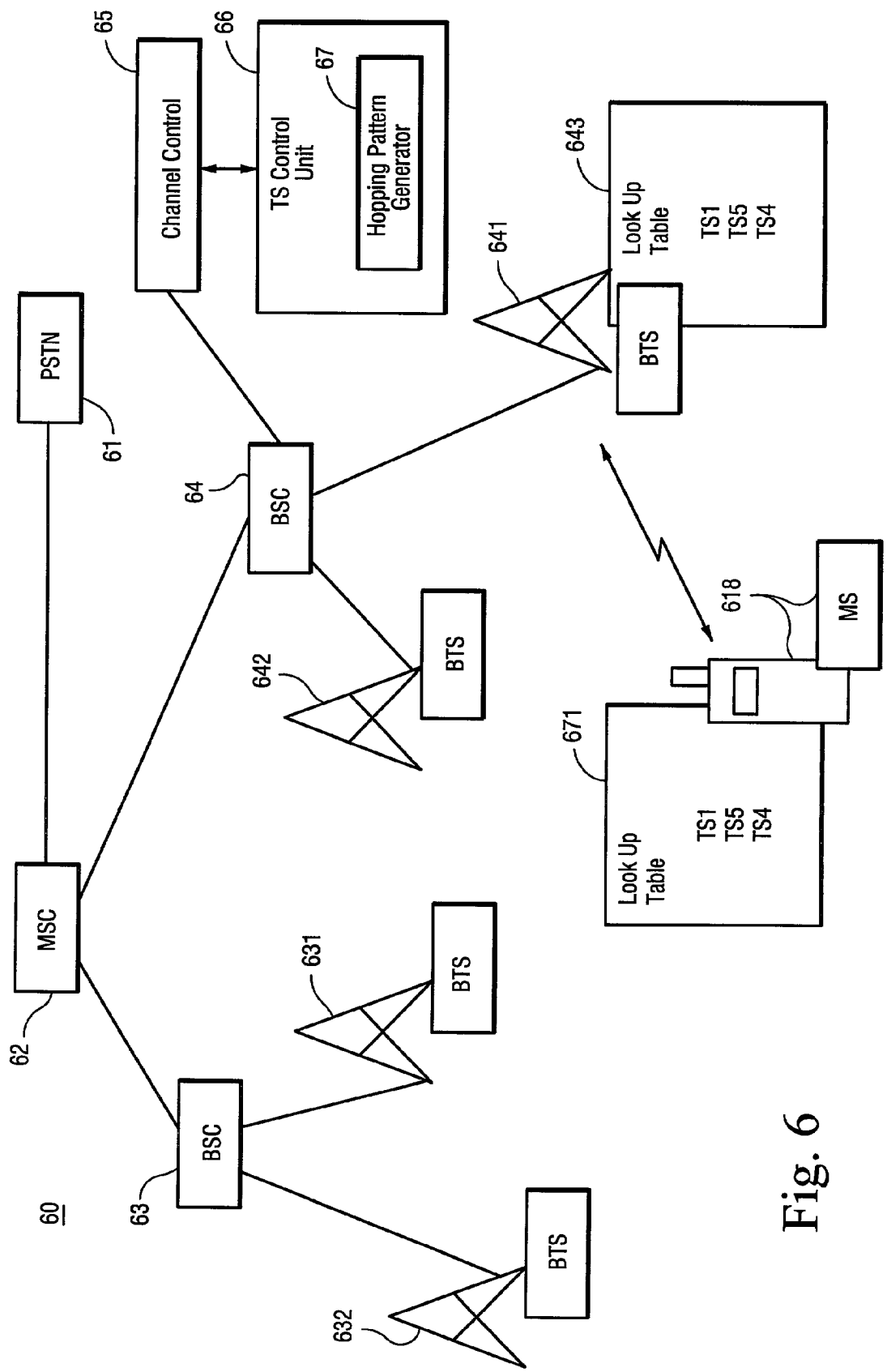
FIG. 6 illustrates an example implementation of the present invention in an example cellular communications system.

FIG. 6 is a high level diagram of a GSM type cellular radio communication system 60 illustrating an example, non-limiting implementation of the present invention. For purposes of clarity, not all of the nodes typically used in a GSM system are illustrated with emphasis being placed on those nodes that are useful in describing the example implementation of the invention.

The GSM cellular system 60 is coupled to a Public Switched Telephone Network (PSTN) 61 via one (or more) Mobile Service Switching Center MSC) 62. As the interface with the PSTN 61, the MSC 62 routes calls to appropriate parts of the cellular network. In some implementations, the MSC 62 includes speech coder/decoder equipment to transcode speech signals, e.g., an incoming Pulse Code Modulated speech connection of 64 kbps is transcoded into a GSM speech coded connection of 12.2 kpbs.

The MSC, 62, is connected to one or more Base Station Controllers (BSC). In FIG. 6, two BSCs 63 and 64 are illustrated. Sometimes these nodes are called radio network control nodes. The BSCs 63 and 64 are coupled to a number of Base Transceiver Stations (BTS) 631, 632, 641, and 642. In general, a BSC controls the radio connections established between its base stations and mobile stations. Based on instructions from the MSC 62, the BSC locates and serves a mobile station 68 via an appropriate base station, which in the example shown is BTS 641.

As part of that service, the BSC allocates radio resources to connections. In a TDMA context, a channel control unit 65 in the BSC 64 allocates a certain timeslot and a certain frequency or frequency hopping pattern to mobile connections served by the BTSs 641 and 642 which are coupled to the BSC 64. The BTSs, 631, 632, 641, and 642 each include appropriate transceiving hardware and/or software, e.g., modulator, demodulator, frequency synthesizer, signal amplifier, antenna unit, etc., to enable transmission and reception of user and control signaling information over the radio interface.

In one aspect of the present invention, the BSC channel control unit 65, in addition to allocating physical resources to a certain connection also controls assignment of a training sequence hopping pattern for that connection. In this example, the channel control unit 65 allocates a frequency or a frequency hopping pattern from the number of available frequencies, a timeslot, and a training sequence hopping pattern according to input received from a training sequence hopping pattern generator 67 in a training sequence (TS) control unit 66. The training sequence control unit 66 generates a training sequence hopping pattern and forwards the pattern, or preferably an indication of the pattern, to the channel control unit 65. Assuming the BSC 64 forwards an indication of the training sequence hopping pattern, that indication is provided both to the appropriate base station and mobile station. The base station and mobile station may either have a replica of the training sequence control algorithm to generate the hopping pattern or a parameterized lookup table to determine the specific training sequence to use for a certain burst. The BTS 641 and mobile station 618 use the latter approach, each having a table 643 and 671, respectively, with the same training sequence pattern selected for use with the current connection, i.e., TS1, TS5, TS4, . . . .

Figure 1:
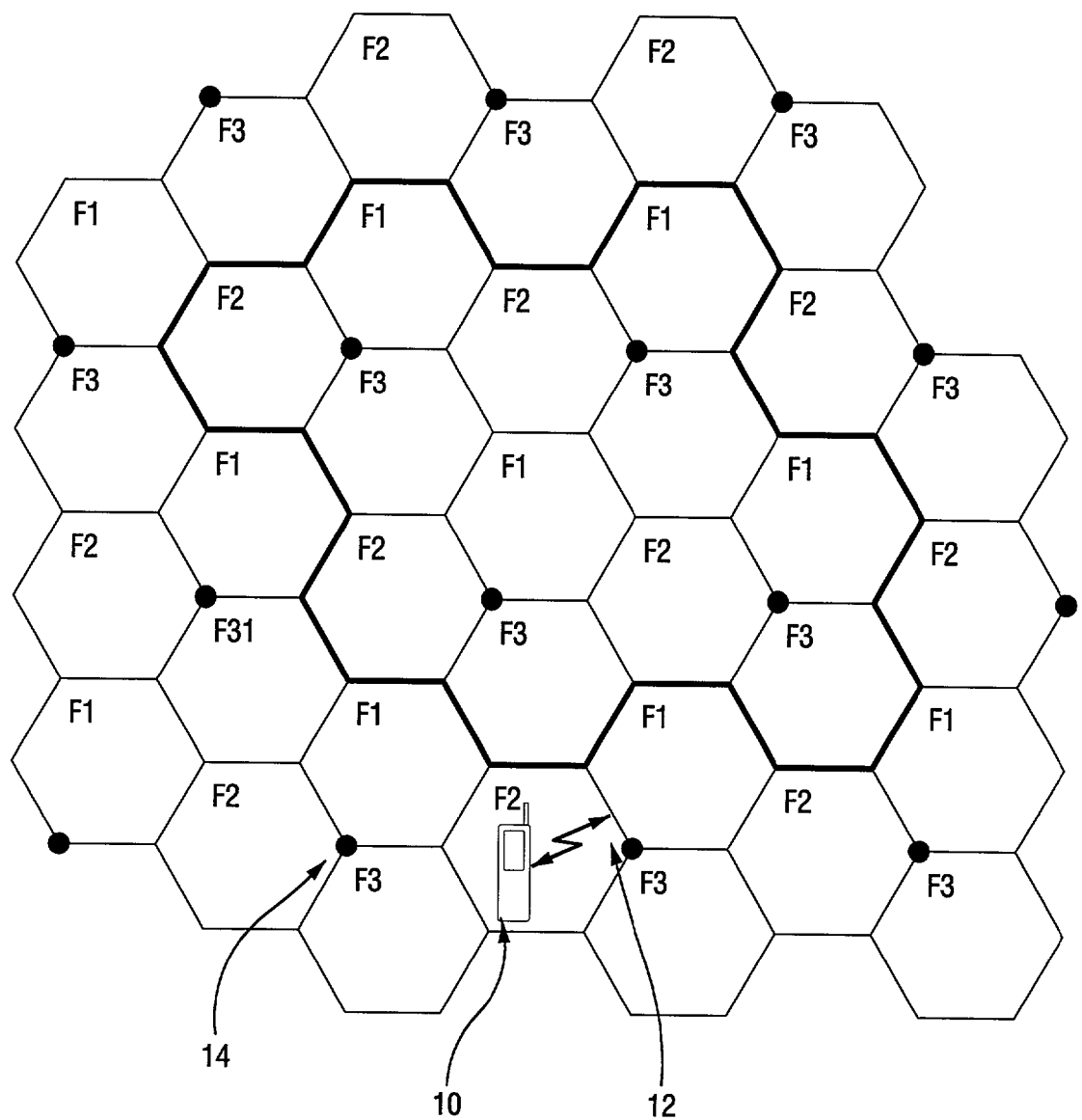
FIG. 1 illustrates a cellular pattern in of an example cellular communication system.
Figure 2:
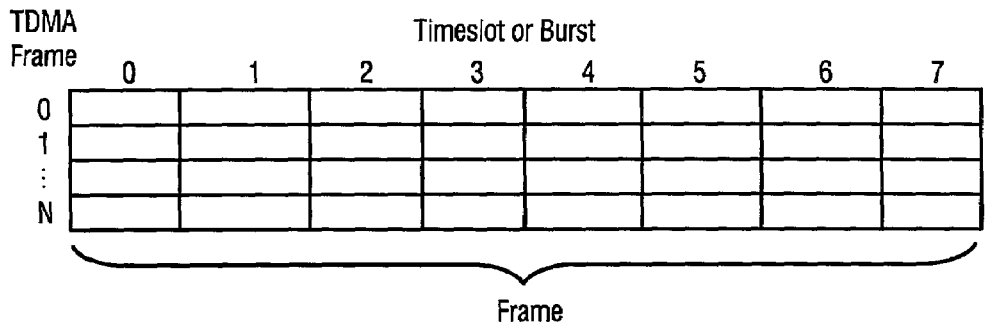
FIG. 2 illustrates a frame repetition pattern for GSM radio channels.
Figure 3:
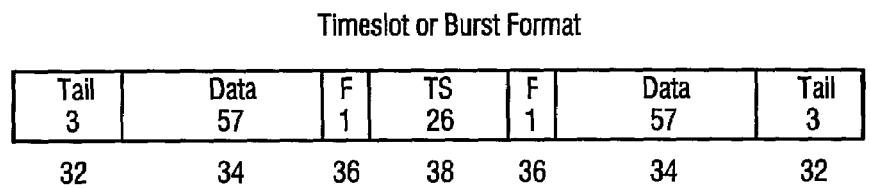
FIG. 3 illustrates a burst structure for a GMSK-modulated signal used in GSM.
Figure 4:
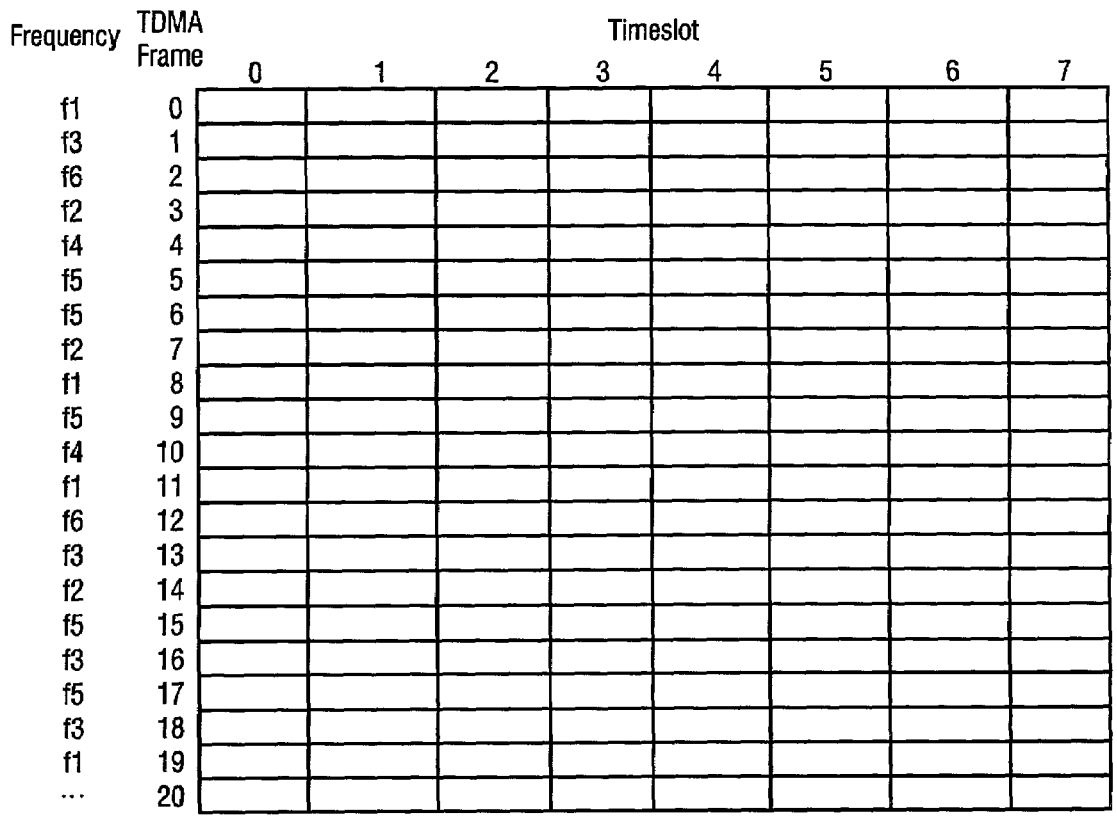
FIG. 4 illustrates an example frequency hopping pattern.
Figure 5:
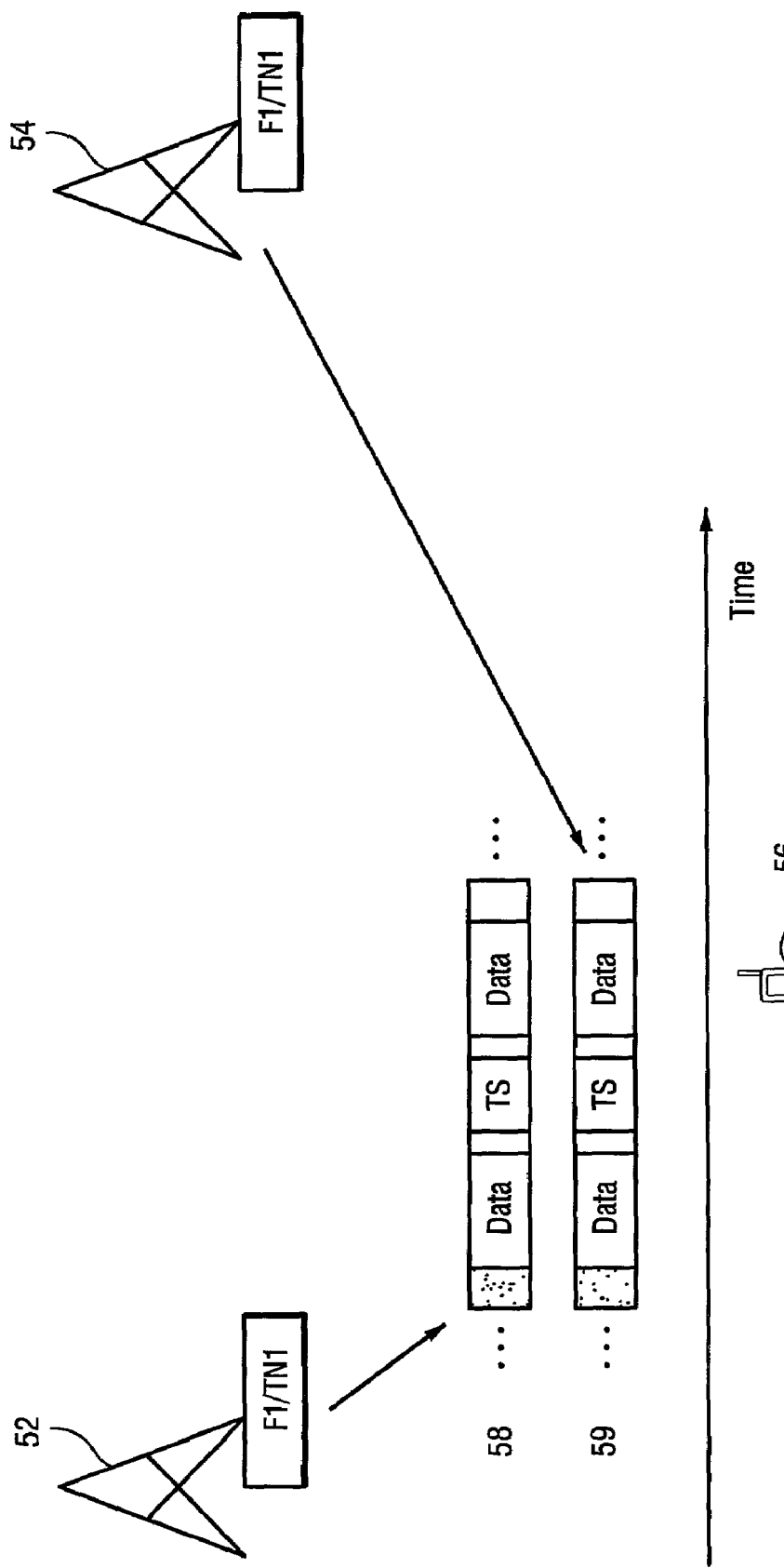
FIG. 5 illustrates transmissions from two base stations in a time synchronized network.

The transmitting entity transmits bursts (such as that shown in FIG. 3) over the interface that include the training sequences retrieved according to the indicated pattern. The receiving entity receives bursts over the radio interface and use the appropriate training sequence from the pattern to correlate with the training sequence of the received burst. The correlation process aids the receiver in determining an estimate of one or more radio channel characteristics and distinguishing a burst for the intended connection from other unintended or undesired signals.

For this example, a downlink communication from a base station 641 to a mobile station 618 occurs on a certain frequency (or with a certain frequency hopping pattern) and on a certain timeslot or number of timeslots. The base station 641 transmits information to the mobile station 618 using the training sequence that is indicated according to the training sequence hopping pattern for a certain burst. The mobile station 618 receives that burst and correlates the burst's training sequence field with the expected training sequence in the pattern. That training sequence correlation is used to estimate the channel and distinguish a burst for the intended connection from other unintended or undesired signals. Similarly, an uplink communication from the mobile station 618 to the base station 641 occurs on a certain frequency (or with a certain frequency hopping pattern) and on a certain timeslot or number of timeslots. The mobile station transmits 618 information to the base station 641 using the training sequence that is indicated according to the training sequence hopping pattern for a certain burst. The base station 641 receives that burst and correlates the burst's training sequence field with the expected training sequence in the pattern. That training sequence correlation is used to estimate the channel and distinguish a burst for the intended connection from other unintended or undesired signals.

Figure 7:
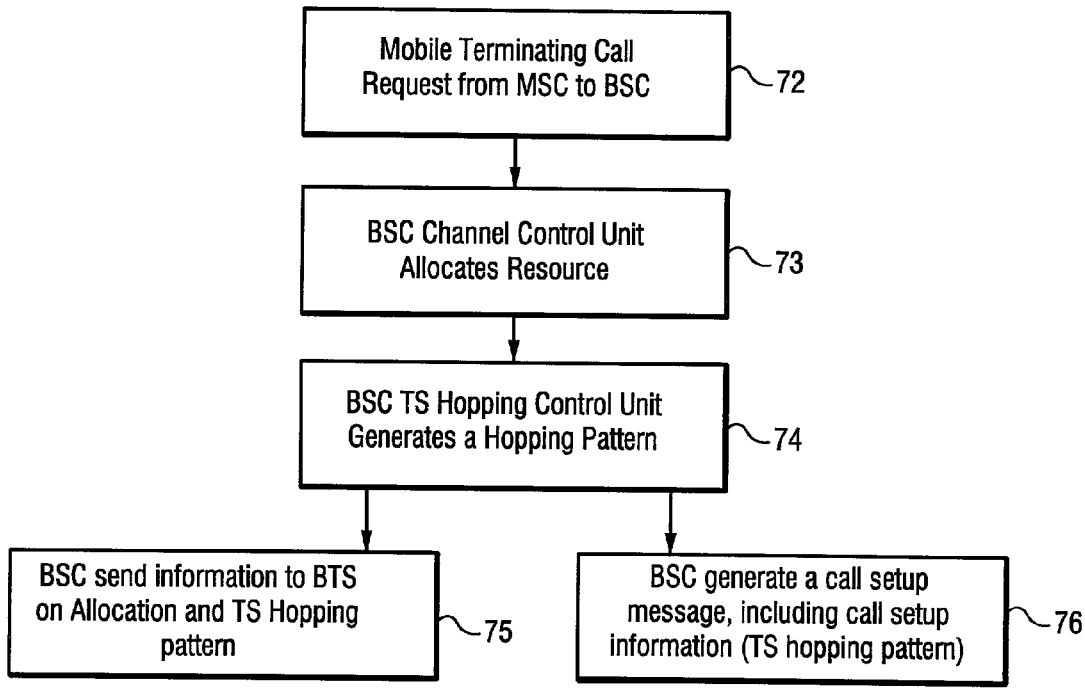
FIG. 7 is a flow chart illustrating example procedures for providing training sequence hopping pattern for a connection to the appropriate base station and mobile station.

FIG. 7 is a flow diagram illustrating example procedures where the present invention is applied to initiation of a downlink, mobile terminating call. Similar procedures may be followed for an uplink, mobile originating call. Although the flow diagram explains several steps pertaining to this example of the invention, it should be understood that several other steps not shown are used in a complete procedure of setting up a call connection.

In step 72, a Mobile Terminating call request reaches a BSC from the PSTN 61 and the MSC 62. In step 73, the channel control unit 65, (optionally using information from the call request such as a requested channel type), allocates resources for the connection. In step 74, the training sequence hopping pattern generator 67 creates a training sequence hopping pattern for the connection. In step 75, information about the allocated resources from the channel control unit 65 and an indication of the training sequence hopping pattern from the training sequence hopping control unit 66 is provided to a base station assigned to support the connection. In step 76, the BSC prepares, and the base station transmits, a call setup message to the called mobile station which might include a radio channel, e.g., a frequency and timeslot, a transmit power level, a call type, etc. The training sequence hopping pattern indication could be an index or address to a lookup table stored in the base and mobile stations or it could be one or more parameter to input in a training sequence hopping algorithm in the base and mobile stations which generates the correct timing sequence number. Alternatively, the base and mobile stations may determine the selected training sequence hopping pattern from other parameters the base and mobile stations may determine.

Figure 8:
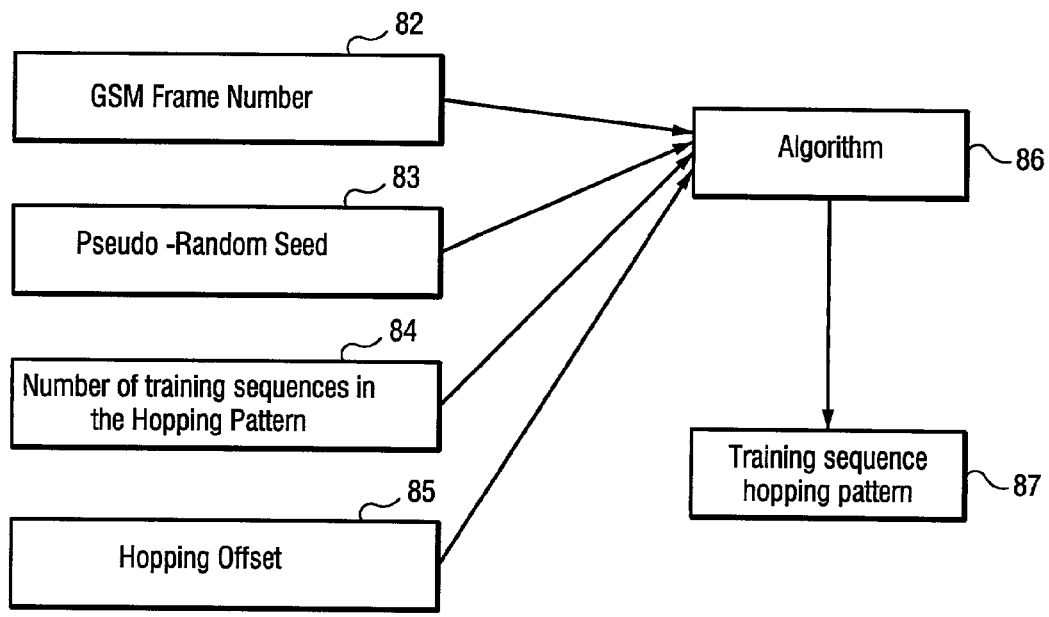
FIGS. 8 and 9 illustrate examples of generating a training sequence hopping pattern.

FIG. 8 illustrates a non-limiting example of a training sequence hopping pattern generator 67, which is preferably but not necessarily implemented in the BSC. A binary algorithm 86 receives and processes one or more parameters, e.g., parameters 82-85, and generates therefrom a corresponding training sequence hopping pattern on a per frame basis. One example input parameter is the GSM frame number 82. GSM frames are numbered from 0 to 2715647, after which the last count, restarts with 0. A pseudo-random "seed" 83 is another parameter that may be used to create a training sequence hopping pattern. Each pseudo-random seed corresponds to a particular training sequence hopping pattern. Another parameter that is needed to create the hopping pattern is a number of training sequences 84 in the training sequence hopping pattern. In the existing GSM system, there are eight training sequence hopping patterns. It is not necessary to use all eight training sequences. Moreover, the value 0 or 1 for this parameter may mean that there should be no training sequence hopping for a certain connection.

As another way to separate user bursts, a hopping offset 85 may be used to vary the way in which the training sequence hopping is performed. The hopping pattern is generated using parameters 82 through 84, and then an offset is added to that hopping pattern. Assume the following training sequence hopping pattern is generated using parameters 82-84:

TS1-TS2-TS5-TS6-TS2-TS1-TS1-TS4-TS0 . . . .

An offset parameter of 3 results in the following training sequence hopping pattern:

TS4-TS5-TS0-TS1-TS5-TS4-TS4-TS7-TS3 . . . .

Of course, fewer, other, or additional parameters may be used. One example of another parameter in a GSM system is the timeslot number corresponding to the assigned radio channel. The training sequence hopping algorithm maybe synchronized with a frequency hopping algorithm in a system that employs frequency hopping to generate a training sequence hopping sequence which also considers the exact frequency a certain connection is utilizing during a specific frame.

Figure 9:
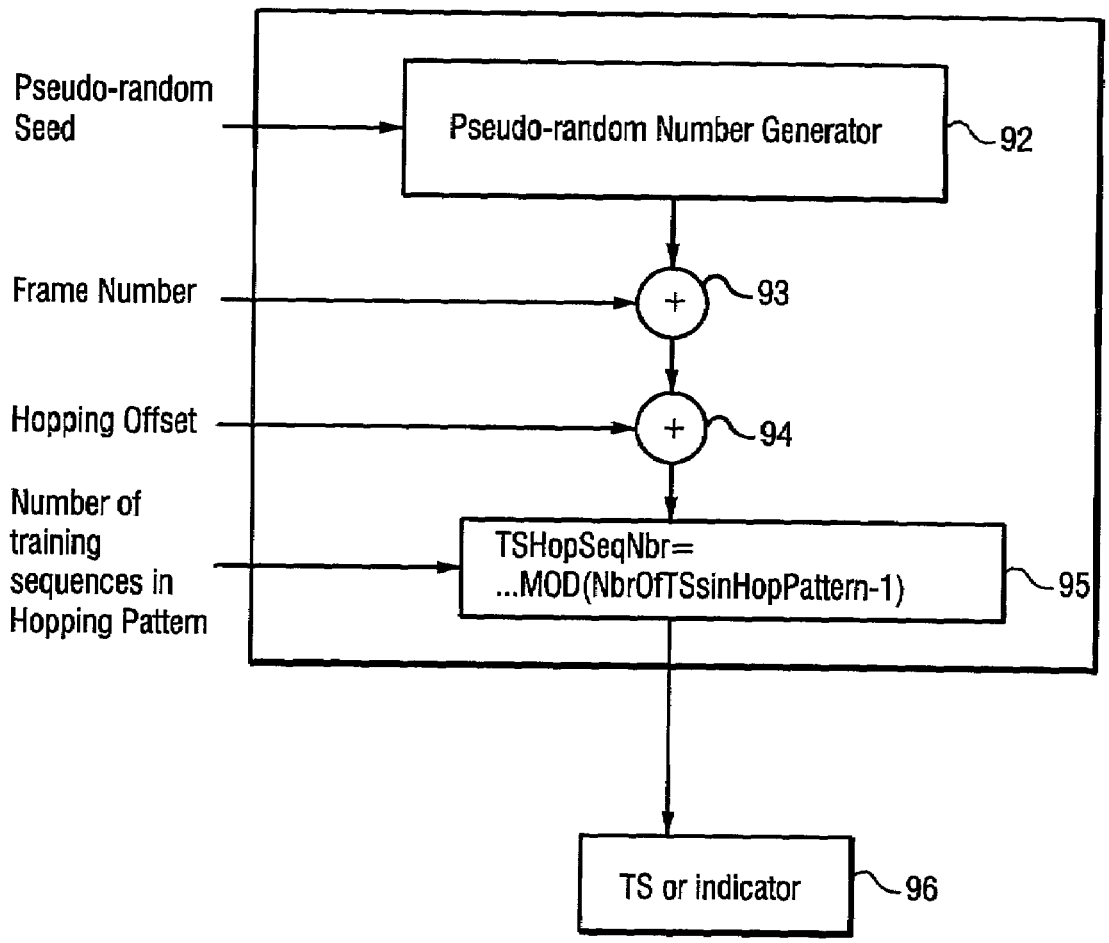

The training sequence hopping pattern generating algorithm 86 may be realized in a number of different ways. FIG. 9 illustrates one simple implementation. A pseudo-random seed is input into a pseudo-random number generator 92. The resulting pseudo-random number sequence generated is added to the present Frame Number in a summer 93. The pseudo-random seed may be used to generate a cyclic training sequence hopping pattern, a pseudo-random training sequence hopping pattern, or some other type of training sequence hopping pattern. A hopping offset may be applied in a summer 94. A training sequence number generator 95 performs a modulo operation of the number of training sequences included in the hopping pattern to identify the training sequence to be used for the subsequent frame as a training sequence index 96. A "−1" is included in the modulo operation, since the output 96 becomes an index, and training sequences are usually numbered from zero rather than one. It should be understood that the algorithm in FIG. 9 is just one example. Numerous variations are possible, including fewer or additional parameters, more sophisticated operations than the ones illustrated.

As mentioned above, the training sequence hopping pattern may be signaled to the transmitting and receiving entities by sending a training sequence hopping pattern indicator. For example, the pseudo-random number seed may be sent. The current frame number is readily available in both the base and mobile stations. In the case of the mobile station, the mobile may also simply read the frame number from other information regularly broadcast in the cell, and apply both the random number seed and the frame number to its training sequence hopping pattern algorithm. If an offset technique is used, the offset parameter may also be signaled to the mobile station, e.g., during a call setup procedure. In addition, the training sequence hopping pattern may be altered if a reallocation of the connections takes place, e.g., a handover, to another frequency, timeslot, frequency hopping pattern, etc.

Although the training sequence hopping may be performed on a frame level, i.e., a training sequence hop is performed after each frame, the training sequence hopping may be performed on some other basis, e.g., on a speech frame basis. Similarly, the training sequence hopping algorithm may be configured so that the same training sequence is not generated on certain timeslots within a certain frame. In this case, the timeslot number could also be an input parameter to the training sequence hopping algorithm.

Figure 10:
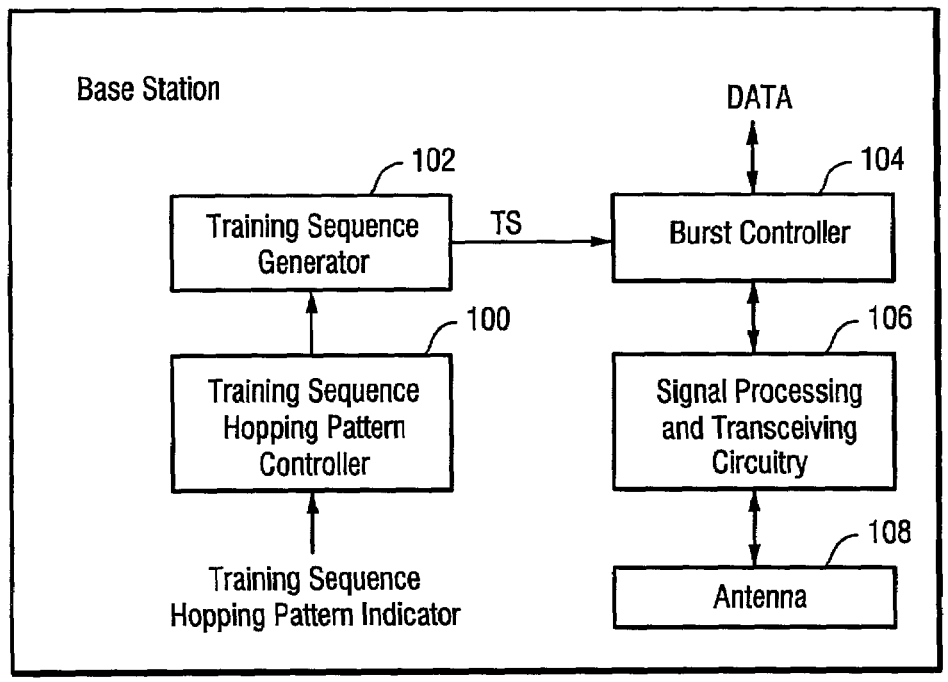
FIG. 10 is a simplified function block diagram illustrating certain function blocks related to one example implementation of the present invention in a base station.

FIG. 10 illustrates a simplified function block diagram relating to an example implementation of the present invention in the base station. A training sequence hopping pattern indicator or parameter provided from the base station controller (or mobile switching center) is received in a training sequence hopping pattern controller 100. The training sequence hopping pattern controller 100 provides a signal to a training sequence generator 102 which generates one of a set of available training sequences. Although there are many different ways in which functions of the training sequence hopping pattern controller 100 and the training sequence generator 102 may be implemented, in one example, the training sequence hopping pattern indicator is used by controller 100 to address a variety of prestored training sequence hopping patterns. The addressed pattern indicates to the training sequence generator 102 which training sequence needs to be generated for a particular burst. The burst controller 104 then incorporates the training sequence generated by the training sequence generator 102 along with the appropriate data. The formatted burst is provided by burst controller 104 to signal processing and transceiving circuitry 106 which performs the appropriate signal processing and transceiving functions and transmits the data bursts via an antenna 108 over the radio interface. Similarly, when a data burst is received from the mobile station by the base station via antenna 108, downconverted and processed by signal processing and transceiving circuitry 106, the burst controller 104 correlates the generated training sequence from the training sequence generator 102. The training sequence correlation information is provided to other entities in the base station (1) for updating a channel model estimate and (2) for assisting in identifying specific bursts relating to the desired connection. Thus, the base station implements training sequence hopping where different training sequences are used for different bursts pertaining to a connection between a base station and a mobile station.

Figure 11:
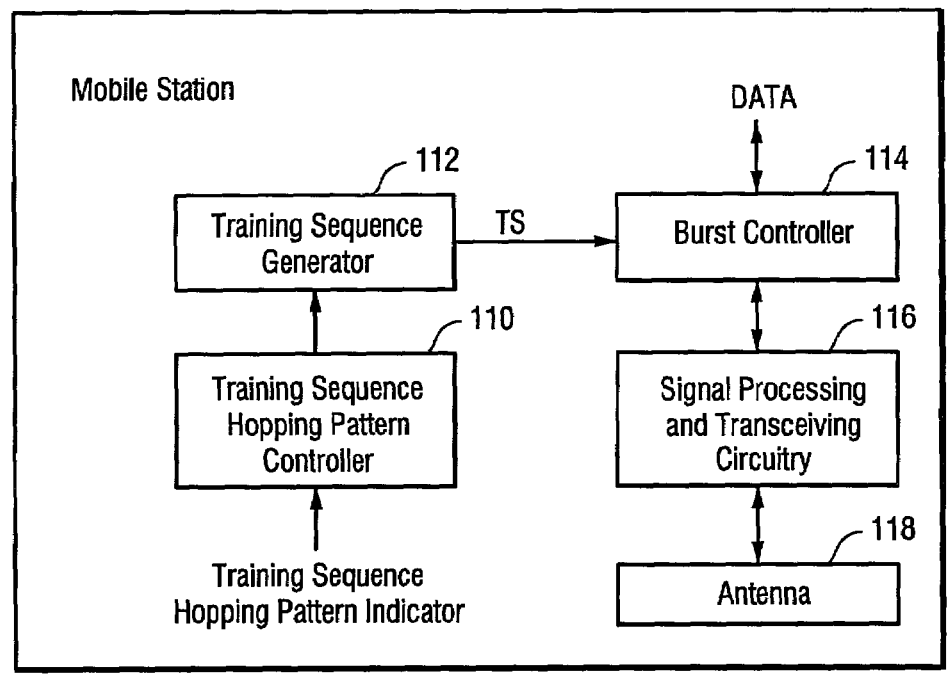
FIG. 11 is a simplified function block diagram illustrating certain function blocks pertaining to an example implementation of the present invention in a mobile station.

FIG. 11 is a simplified function block diagram of a mobile station for implementing an example of the present invention in the mobile station. A training sequence hopping pattern indicator or parameter provided from the base station controller (or mobile switching center) is received in a training sequence hopping pattern controller 110. The training sequence hopping pattern controller 110 provides a signal to a training sequence generator 112 which generates one of a set of available training sequences. Although there are many different ways in which functions of the training sequence hopping pattern controller 100 and the training sequence generator 112 may be implemented, in one example, the training sequence hopping pattern indicator is used by controller 110 to address a variety of prestored training sequence hopping patterns. The addressed pattern indicates to the training sequence operator 112 which training sequence needs to be generated for a particular burst. The burst controller 114 then incorporates the training sequence generated by the training sequence generator 112 along with the appropriate data. The formatted burst is provided by burst controller 114 to signal processing and transceiving circuitry 116 which provides the appropriate signal processing and transceiving functions to transmit the data bursts via an antenna 118 over the radio interface. Similarly, when a data burst is received from the mobile station by the base station via antenna 118, downconverted and processed by signal processing and transceiving circuitry 116, the burst controller 114 correlates the generated training sequence from the training sequence generator 112. The training sequence correlation information to other entities in the base station (1) for updating a channel estimate and (2) for assisting in identifying bursts relating to the desired connection.

With training sequence hopping, different training sequence cross-correlations between the training sequence associated with a desired data burst and a training sequence associated with an interfering data burst occur during a transmission. Most training sequence cross-correlations are low, and typically only a small number of the total bursts for a communication are normally adversely affected by higher cross-correlations. As a result, training sequences in each data burst may be used reliably to distinguish between bursts related to different users as well as to model the current radio channel supporting a connection. In some instances, applied channel coding may be sufficient for the receiver to correct the effect of adversely affected bursts. Training sequence hopping ensures that worst interference scenarios do not prevail for longer than one training sequence hopping interval as opposed to the duration of the entire connection. Training sequence hopping also eliminates the difficult task of training sequence planning.

Although the present invention has been described with examples from a GSM circuit-switched communication system, the present invention is also applicable to any other, circuit-switched or packet-switched communication system. In addition, even in the context of a GSM type system, certain described functions may be performed in different nodes. For example, certain functionality described as being performed in the BSC node may alternatively be implemented in the MSC node or other nodes if desired. Accordingly, the specific embodiment is only an example and does not limit the scope of the invention. The invention is defined by the following claims.

What is claimed:

1. A method for use in a radio communications system, comprising:

for a signal connection between a mobile radio and a base station transceiver in a radio network, assigning a first training sequence for a first unit of information associated with the signal to be transmitted during a first time slot over the connection; and assigning a second training sequence for a second unit of information associated with the signal to be transmitted during a second time slot over the connection between the mobile radio and the base station transceiver, wherein different training sequences are assigned for different units of information associated with the signal to be transmitted during different time slots over the connection between the mobile radio and the base station transceiver to provide training sequence hopping for the signal transmission.

2. The method in claim 1, wherein the different training sequences are assigned for consecutive units of information in the signal to be transmitted over the connection.

3. The method in claim 1, wherein the assignment of training sequences to the different units of information in the signal to be transmitted over the connection follows a cyclic pattern.

4. The method in claim 1, wherein the assignment of training sequences to the different units of information in the signal to be transmitted over the connection follows a pseudo-random pattern.

5. The method in claim 1, wherein the first and second training sequences are members of a training sequence set, where each member has a favorable auto-correlation with other members in the set.

6. The method in claim 1, further comprising:
transmitting the first training sequence over the connection from the base station transceiver to the mobile station along with the first unit of information, and
the mobile station using the first training sequence in detecting the transmitted first unit.

7. The method in claim 6, wherein the radio network provides the base station and the mobile station with a training sequence indicator, and wherein the base station uses the training sequence indicator to transmit the first training sequence and the mobile station uses the training sequence indicator to provide the first training sequence in detecting the transmitted first unit.

8. The method in claim 1, further comprising:
transmitting the first training sequence as part of the signal transmission over the connection from the mobile station to the base station transceiver along with the first unit of information, and
the base station using the first training sequence in detecting the transmitted first unit.

9. The method in claim 1, wherein the radio communications system is a cellular network where transmissions from different cells are synchronized.

10. A method for use in a time division multiple access (TDMA) cellular radio communications network comprising:
changing a training sequence in a signal during transmission of the signal over a time slotted connection between a base station transceiver in the network and a mobile radio;
assigning a training sequence hopping pattern to the signal transmission over the connection between the base station transceiver and the mobile radio; and
using the training seguence hopping pattern to generate different training sequences in the signal for different time slots of the transmission of the signal over the connection between the base station transceiver and the mobile radio.

11. The method in claim 10, wherein the TDMA cellular radio communications network further employs frequency hopping.

12. The method in claim 10, wherein the training sequence hopping pattern is stored in a look-up table.

13. The method in claim 10, wherein the training sequence hopping pattern is generated using one or more training sequence parameters.

14. The method in claim 13, wherein the one or more training sequence parameters include one or more of the following: a frame number, a seed, and a number of training sequences.

15. The method in claim 10, further comprising generating an offset training sequence hopping pattern from the training sequence hopping pattern assigned to the signal.

16. The method in claim 10, further comprising selecting one of a set of training sequences to use during a first time slot of the signal transmission and providing an indicator of the one training sequence to the base station and to the mobile station.

17. The method in claim 16, further comprising selecting a second of the set of training sequences to use during a second time slot of the signal transmission and providing an indicator of the second training sequence to the base station and to the mobile station.

18. A radio communications system comprising:
one or more base stations each including at least one base station transceiver;
a mobile radio configured to communicate with one of the base station transceivers over a radio interface; and
a radio network node configured to establish a time-divided signal connection between the base station transceiver and the mobile station and to transmit different portions of data during different time slots of the signal transmission over the connection, the radio network node including a training sequence controller configured to change a training sequence used during a signal transmission over the connection between the base station transceiver and the mobile station such that a first training sequence is used during a first time slot of the signal transmission over the connection and a second training sequence is used during a second time slot of the signal transmission over the connection.

19. The system in claim 18, wherein the training sequence controller includes a training sequence hopping pattern generator configured to generate a training sequence hopping pattern for the signal, wherein the pattern indicates how the training sequence is to be changed during the signal transmission over the connection.

20. The system in claim 18, wherein the radio network node is configured to provide the training sequence hopping pattern to the base station and to the mobile station.

21. The system in claim 20, wherein the radio network node is configured to provide the training sequence hopping pattern to the base station and to the mobile station along with information pertaining to radio resources allocated for the signal connection during a connection set up-procedure.

22. The system in claim 21, wherein the radio network node is configured to provide the training sequence hopping pattern to a new base station transceiver in conjunction with a handover of the connection to the new base station transceiver.

23. The system in claim 18, wherein the system is a GSM type cellular radio system and the radio network node is either a base station controller or a mobile switching center.

24. A radio network node for use in a cellular communications network comprising:
a resource controller configured to determine resources to support a signal connection between a base station transceiver and a mobile station where different units of information associated with the signal to be transmitted over the connection are associated with different transmission time slots for the signal to be transmitted over the connection, and
a training sequence hopping controller configured to determine a training sequence hopping pattern for the signal transmission over the connection between the base station transceiver and the mobile station, wherein the training sequence hopping pattern includes different training sequences to be used during the different transmission time slots for the signal transmission over the connection between the base station transceiver and the mobile station.

25. The radio network node in claim 24, wherein the training sequence hopping controller is configured to determine the training sequence hopping pattern using one or more parameters.

26. The radio network node in claim 25, wherein the one or more parameters include one or more of the following: a frame number, a seed, and a number of training sequences.

27. The radio network node in claim 26, wherein the training sequence hopping controller is configured to generate an offset training sequence hopping pattern.

28. The radio network node in claim 24, wherein the training sequence hopping controller is configured to generate a cyclic training sequence hopping pattern.

29. The radio network node in claim 24, wherein the training sequence hopping controller is configured to generate a pseudo-random training sequence hopping pattern.

30. The radio network node in claim 24, wherein the training sequence hopping controller is configured to provide an indication of the training sequence hopping pattern for the signal connection to the base station transceiver and the mobile station.

31. The radio network node in claim 30, wherein the resource controller is configured to assign radio channel resources to the signal connection during a connection set up procedure and the training sequence hopping controller is configured to provide an indication of the training sequence hopping pattern for the signal transmission over the connection between the base station transceiver and the mobile station during the call set up procedure.

32. The radio network node in claim 30, wherein the indication includes a sequence of seeds corresponding to the training sequence hopping pattern for the signal transmission.

33. The radio network node in claim 30, wherein the indication includes a sequence of table lookup addresses corresponding to the training sequence hopping pattern for the signal transmission over the connection.

34. The radio network node in claim 30, wherein each training sequence pattern includes an associated identifier, and wherein the indication includes one of the training sequence hopping pattern identifiers.

35. The radio network node in claim 30, wherein the indication includes some portion or all of the training sequences in the order corresponding to the training sequence hopping pattern for signal transmission over the connection.

36. A training sequence generator for use in a radio node, comprising:
    electronic circuitry configured to perform the following tasks:
    provide a first training sequence corresponding to a first time slot in a signal transmission over a connection between a base station transceiver in a radio network and a mobile station, and
    provide a second training sequence corresponding to a second time slot in the same signal transmission over the connection between the base station transceiver and the mobile station "wherein the electronic circuitry is configured to provide the first and second training sequences for use during their respective first and second time slots in the same signal transmission over the connection betweenthe base station transceiver and the mobile station."

37. The training sequence generator in claim 36, wherein the first and second training sequences may be used to estimate a characteristic of a radio channel supporting the signal transmission.

38. The training sequence generator in claim 36, wherein the electronic circuitry is configured to process a first training sequence indicator for the first time interval in the signal transmission in order to generate the first training sequence and a second training sequence indicator for the second time interval in the signal transmission in order to generate the second training sequence.

39. The training sequence generator in claim 38, wherein the electronic circuitry includes a look-up table for storing the first and second training sequences, and wherein the electronic circuitry is configured to access the first and second training sequences using the first and second indicators, respectively.

40. The training sequence generator in claim 36, wherein the electronic circuitry is configured to generate information for the first and second training sequences using first and second seeds, respectively.

41. The training sequence generator in claim 36, wherein the electronic circuitry is configured to generate information for the first and second training sequences using a frame number and a number of training sequences in a training sequence pattern assigned to the signal transmission, respectively.

42. The training sequence generator in claim 36, wherein the electronic circuitry is configured to generate information for the first and second training sequences using an offset from a training sequence pattern assigned to the signal transmission.

43. The training sequence generator in claim 36, wherein the first and second training sequences are members of a training sequence set, where each member has a favorable auto-correlation with other members in the set.

44. The training sequence generator in claim 36, wherein the electronic circuitry is configured to generate information for the first and second training sequences cyclically.

45. The training sequence generator in claim 36, wherein the electronic circuitry is configured to generate information for the first and second training sequences pseudo-randomly.

46. The training sequence generator in claim 36, wherein the radio node is one of a base station controller, a base station, and a mobile station.

47. A mobile radio terminal configured to communicate with a cellular communications network, comprising:
    processing and transceiving circuitry configured to communicate information with a base station transceiver in the cellular communications network over a radio-based signal transmission conveyed over a connection between the base station transceiver and the mobile radio terminal, and
    a training sequence hopping controller configured to determine a training sequence hopping pattern for the signal transmission,
    wherein the training sequence hopping pattern includes different training sequences to be used during different time slots of the signal transmission over the connection between the base station transceiver and the mobile station.

48. The radio network node in claim 47, wherein the training sequence hopping controller is configured to determine the training sequence hopping pattern using one or more patterns.

49. The radio network node in claim 48, wherein the one or more parameters include one or more of the following: a frame number, a seed, and a number of training sequences.

50. The radio network node in claim 49, wherein the training sequence hopping controller is configured to generate an offset training sequence hopping pattern.

51. The radio network node in claim 47, wherein the training sequence hopping controller is configured to generate a cyclic training sequence hopping pattern.

52. The radio network node in claim 47, wherein the training sequence hopping controller is configured to generate a pseudo-random training sequence hopping pattern.

53. The radio network node in claim 47, wherein the training sequence hopping controller is configured to provide an indication of the training sequence hopping pattern for the signal transmission to the base station and the mobile station.

54. The radio network node in claim 53, wherein the indication includes a sequence of seeds corresponding to the training sequence hopping pattern for the connection.

55. The radio network node in claim 53, wherein the indication includes a sequence of table lookup addresses corresponding to the training sequence hopping pattern for the connection.

56. The radio network node in claim 53, wherein each training sequence pattern includes an associated identifier, and wherein the indication includes one of the training sequence hopping pattern identifiers.

57. The radio network node in claim 53, wherein the indication includes some portion or all of the training sequences in the order corresponding to the training sequence hopping pattern for the connection.

* * * * *